United States Patent [19]

Sprintschnik et al.

[11] Patent Number: 4,945,004

[45] Date of Patent: Jul. 31, 1990

[54] BASE MATERIAL FOR AN ALUMINUM OFFSET PRINTING PLATE

[75] Inventors: Gerhard Sprintschnik, Taunusstein; Walter Niederstaetter, Eltville; Kurt Reiss, Wiesbaden; Wolfgang V. Asten, Pulheim; Gunther Scharf, Boon; Barbara Grzemba, Bonn, all of Fed. Rep. of Germany

[73] Assignees: Hoechst AG, Frankfurt am Main; Vereinigte-Aluminum Werke AG., Bonn, both of Fed. Rep. of Germany

[21] Appl. No.: 186,152

[22] Filed: Apr. 26, 1988

[30] Foreign Application Priority Data

Apr. 28, 1987 [DE] Fed. Rep. of Germany ....... 3714059

[51] Int. Cl.[5] .............................................. B32B 9/00

[52] U.S. Cl. .................................... 428/469; 101/456; 101/467

[58] Field of Search ................. 428/469; 101/456, 467

[56] References Cited

U.S. PATENT DOCUMENTS

| | | | |
|---|---|---|---|
| 3,911,819 | 10/1975 | Pryor et al. | 101/459 |
| 3,944,439 | 3/1976 | Pryor et al. | 148/2 |
| 4,098,619 | 7/1978 | Franz | 148/2 |
| 4,686,083 | 8/1987 | Takizawa et al. | 420/548 |

FOREIGN PATENT DOCUMENTS

| | | |
|---|---|---|
| 3307613 | 9/1983 | Fed. Rep. of Germany . |
| 1421710 | 1/1976 | United Kingdom . |
| 164856 | 4/1985 | United Kingdom . |

*Primary Examiner*—Edith Buffalow
*Attorney, Agent, or Firm*—Perman & Green

[57] ABSTRACT

The invention is directed toward a base material for aluminium offset printing plates having improved heat stability comprising an aluminum alloy consisting of from about 0.2 to about 0.6% by weight of iron, less than about 0.25% by weight silicon and copper combined, from about 0.1 to about 0.3% by weight manganese and the remainder being aluminum and trace production impurities, said base material further characterized as containing secondary precipitates in the form of phases of the Al Mn Si: Al Fe: Al Mn type which bear a ratio to one another of from about 1:1:2 to about 1:1:3, the mean particle size being from about 0.25 to about 0.010 micron with a maximum particle size of less than about 0.3 micron and further containing a precipitation structure with a degree of dispersion of less than about 50 phases per cubic micron and a process for producing such material. The sheet material according to this invention may be uniformly roughened in either HCl or $HNO_3$ electrolyte baths under very similar process parameters.

8 Claims, No Drawings

BASE MATERIAL FOR AN ALUMINUM OFFSET PRINTING PLATE

BACKGROUND OF THE INVENTION

1. Technical Field

The invention relates to a base material for an aluminum offset printing form (plate) consisting of from about 0.2 to about 0.6% by weight iron, less than about 1% by weight manganese, and less than about 0.25% by weight silicon and copper, the rest being aluminum and impurities occasioned by production, and also a process for producing such base material.

2. Background and Prior Art

There is a need for offset printing plates which have an increased usage life (print run). The increased usage life can be achieved by burning in or hardening the photographic image on the plate for a few minutes at 230°-240° C. As a result of this treatment, the plates become very resistant to abrasion.

Pure aluminum is predominantly used in the manufacture of printing plates as, for example, described in Aluminum-Taschenbuch, 14th edition, page 109. These plates can be electrochemically roughened or grained in HCL baths and also in $HNO_3$ baths to produce a bright, uniform surface appearance. However pure aluminum suffers a considerable loss in strength as a consequence of the heat generated during the burning in so that this material cannot fulfill the increased demands on the print run.

Some plate manufacturers are therefore using an AlMn alloy AA 3003 which contains approximately 1% Mn and is thermally much more stable than pure aluminum. Offset printing plates composed of manganese-containing alloys are also known from EP-A-0,164,856. This patent discloses aluminum alloys containing from 0.05 to 1% by weight of Mn, 0.02 to 0.2% by weight of Si, and 0.05% to 0.5% by weight of Fe. These manganese-containing alloys have the disadvantage that while the surface can be satisfactorily roughened in an HCl bath with modified process parameters, the surface is very poorly (nonuniformly) roughened in an $HNO_3$ bath. In both acid systems, a dark coating is produced on the surface which has an adverse effect on the printing properties. In EP-A-0,164,856, no information is given concerning the roughening behavior of the AlMn material in an HCl bath on the one hand and in an $HNO_3$ bath on the other hand, or on the roughening behavior as a function of the manganese content.

Processes for producing an aluminum base sheet for printing plates by treating the surface with an aqueous chloride-containing electrolyte solution followed by subsequent anodization is known in the art, as for example disclosed in German Patent Specification No. 2,557,222.

Accordingly, an object of the present invention is to provide a base material for aluminum offset printing plates and a process for producing same which, while having good thermal stability under burning-in conditions after roughening in HCl or $HNO_3$ baths, has a more uniform and brighter surface than conventional manganese-containing aluminum alloys and which is comparable with the plate surface quality which can be achieved with pure aluminum.

DETAILED DESCRIPTION OF THE INVENTION

According to the invention, this and other objects are achieved by the features specified in this application. It has been discovered that, with a narrowly limited manganese content and with adherence to a certain manufacturing process, a structure can be achieved which exhibits optimum properties from the point of view of both the roughening behavior and also of the thermal stability of aluminum sheet.

It is possible to roughen the aluminum sheet according to the present invention electrochemically in an HCl or $HNO_3$ bath just as satisfactorily as pure aluminum sheet can be roughened. Surprisingly, the roughening in the HCl or $HNO_3$ systems can be carried out without changing the bath parameters (acid concentration, bath temperature, current density) which are used for roughening pure aluminum. That is to say, the standard processes for roughening pure aluminum sheet can also be used for the AlMn alloy sheet which is the subject matter of this invention.

The aluminum base material according to the present invention may be characterized as an aluminum alloy consisting of about 0.2 to about 0.6% by weight of iron, less than about 1% by weight of manganese, less than about 0.25% by weight silicon and copper, more preferably from about 0.04 to about 0.23% by weight silicon, the remainder being aluminum and elements present as the result of production impurities. More preferably, the base material contains from about 0.1 to about 0.3% by weight of manganese and at least about 99% by weight aluminum. The most preferred composition for achieving sheet material exhibiting excellent graining properties and thermal stability consists of from about 0.27 to about 0.29% by weight iron, from about 0.12 to about 0.14% by weight silicon and from about 0.11 to about 0.13% by weight manganese, the remainder being aluminum and production impurities.

On the basis of numerous experiments it was discovered that the elements Fe and Mn, both in dissolved form and also as superfine precipitates, are responsible for the thermostability achieved according to the present invention. The iron content of about 0.2-0.6% by weight is such that, on the one hand, a strength-enhancing effect due to Fe and superfine AlFe precipitates dissolved in the aluminum occurs, and, on the other hand, no coarse AlFeSi and AlMnFeSi phases of greater than about 10 microns are produced in the cast aluminum structure. The manganese content of about 0.1-0.3% by weight results in a further increase in the thermal stability due to Mn in solid solution and also due to fine AlMnSi precipitates. The manganese content is limited solely in relation to the roughening behavior. The AlMnSi and AlMn phases have to be very fine and must not be too numerous so that they do not interfere in the electrochemical roughening.

The aluminum alloy of the present invention is formed into sheet material using a continuous casting process whereby ingots are formed having a preferred thickness in the range of about 400 to 600 mm. The ingot is then subjected to a preheating step, also known as homogenizing, wherein it is heated to a metal temperature of from about 550° to about 600° C. It is maintained at this temperature (soaked) for a period of at least about 4 hours up to about 12 hours. The ingot is then subjected to a series of roll milling operations to transform it into a sheet material having the desired thickness. The first operation is a hot rolling operation carried out at a metal temperature within the range of about 460° to about 550° C. During this operation the thickness of the ingot is reduced considerably. Next the sheet is subjected to a hot strip milling process at a temperature in the range of about 300° to 330° C. and rolled to produce a sheet or strip thickness within the range of about 2.5 to about 3.5 millimeters. The resulting sheet is then cooled to room temperature (below about 30° C.) and subjected to a cold rolling process to yield a final sheet thickness in the range of about 0.5 to about 1 millimeter. Optionally, the cold rolling process may be interrupted and the sheet may be annealed prior to further cold rolling. The annealing process involves reheating the metal to a temperature in the range of about 320° to 380° C. and holding it at that temperature for a period of time sufficient to temper the metal, for example at least 3 hours up to about 10 hours. The sheet is then again cooled to room temperature and subjected to a final cold rolling operation during which the subsequent thickness reduction to the final thickness is at least about 70%.

Unlike sheet prepared by most prior art processes and by the process described in EP-A 0,164,856, the sheet produced according to this invention need not be subjected to a finishing annealing step, such as heating the sheet to a temperature of 200° to 320° C. It has been found that such a final anneal tends to yield larger and more numerous precipitate phases in the aluminum structure, which is detrimental to electrochemical roughening.

The process according to the invention is based on the discovery that the properties of the aluminum offset printing plates are a function of the nature, quantity, and density of the secondary phases in the base material. It has been found that the hot strip production temperature contributes substantially to controlling the formation of phases. Also, it has been discovered that it is important that no final post-cold rolling anneal take place as pointed out above. The sheet is ready for chemical roughening in baths such as HCl or $HNO_3$ after the final cold rolling to the desired thickness and after the customary drawing and degreasing.

The material developed according to the present invention is characterized by a fine prerecipitate phase structure with a degree of dispersion of less than about 50 phases per cubic micron. At the same time, the AlMnSi, AlFe and AlMn phases must be less than about 0.3 microns in size, with a mean particle size of about 0.05 to about 0.1 microns. The AlMnSi:AlFe:AlMn quantitative ratio of the phases is from about 1:1:2 to about 1:1:3. This is achieved by processing the alloy according to the parameters of this invention.

The sheets are then further treated to prepare the surface for the application of photosensitive coatings. If necessary, the surface of the sheet is first cleaned (or pickled) to remove any grease, soil or other containments occasioned by production. This may be accomplished by immersing the sheet in an aqueous alkaline etching solution for a period of generally less than 2 minutes. The most preferred treatment is immersion in an about 1 to about 6% by weight solution of NaOH at a temperature of about 45° to about 55° C. for a period of time of about 10 to about 60 seconds.

The sheet is then ready for the roughening or graining process. Roughening is preferably carried out by the electrochemical process wherein the sheet is immersed in a bath of HCl or $HNO_3$ and electric current is passed through the sheet. This treatment may be carried out in a hydrochloric acid system containing from about 0.4 to about 2% by weight of HCl with an applied current density of from about 50 to about 200 amperes per 1 $dm^2$, a voltage of from about 20 to about 60 volts, a residence time of about 5 to 30 seconds and at a temperature of from about 35° to about 50° C. This treatment may also be carried out in a nitric acid system containing from about 0.4 to about 2% $HNO_3$ with an applied current density of from about 50 to about 200 amperes per $dm^2$, a voltage of from about 20 to about 60 volts, a residence time of from about 5 to about 30 seconds and a temperature of from about 40° to about 55° C.

The roughening may also be accomplished by a combination of the electrochemical treatment and other chemical or mechanical roughening, such as rubbing the surface using wire brushes or nylon brushes in combination with abrasives. The electrochemical roughening process is preferred because a more uniformly roughened surface can be obtained.

Next the sheets are subjected to an anodic oxidation process which produces a thin oxide layer on the surface. This oxide layer is formed by passing a DC or AC current through the aluminum sheet immersed in an aqueous solution of an acid such as sulfuric, phosphoric, chromic or the like. Generally the concentration of acid in solution ranges from about 5 to about 35% by weight, the temperature of the solution ranges from about 30° to 60° C., the applied current density may range from about 2 to about 60 amperes per $dm^2$, the applied voltage may range from about 15 to 60 volts and the residence time may range from about 15 to 80 seconds. The preferred anodizing acid is sulfuric acid. The preferred conditions of anodization are such as to yield an oxide coating having a weight of from about 1 to about 6 grams per square meter.

Optionally, the sheets may be subjected to an intermediate cleaning or etching step between the roughening and anodizing steps. This step is preferably carried out by immersion of the sheet in a strong acid solution such as an aqueous solution containing from about 50 to about 350 grams $H_2SO_4$/liter of water at a temperature of from about 45° to 75° C. for a residence time of from about 3 to about 30 seconds.

Optionally, the anodized sheet may then be treated with a coating whose purpose is to seal the anodized layer and render the surface more hydrophilic.

The preferred hydrophilizing material is polyvinylphosphonic acid which may be applied to the sheet by dipping in a solution of polyvinylphosphonic acid at a concentration of about 20 to about 50% by weight, preferably about 35% by weight, at a temperature of about 50° C. This treatment is known for example from German Patent Specification No. 1,621,478.

The sheets are then ready for coating with photosensitive compositions as are known in the art. These light sensitive layers generally include solvent solutions of naphthoquinone diazonium salts and esters, mixed with a novolak resin or a polyvinyl phenol resin, and are known in the art.

The coated sheets are then dried to remove the solvent. The thickness of these photosensitive layers generally ranges from about 0.2 to about 6 grams/$m^2$.

These sheets may then be cut to the appropriate size for use as printing plates. The plates are then suitable for photographic exposure and development as is known in the art.

The thermal stability of the sheet material developed according to this invention can be seen from the strength values shown in Table 1 compared with the commercially available pure aluminum (99.5) and AlMnlCu (3003) materials.

The following Examples are illustrative of the invention.

EXAMPLES 1-6

In the examples, sheets of AlMn alloys with contents of 0.1–1% Mn and sheets of Al 99.5 were electrochemically roughened under identical conditions. A sheet of each alloy was roughened in a hydrochloric acid system and, another sheet of the same alloy was roughened in a nitric acid system.

The sheets were contacted with the following solutions and the appropriate roughening solution was roughened under the conditions indicated:

Alkaline pickling: 4% sodium hydroxide solution at 50° C. for a residence time of 25 seconds;

Hydrochloric acid system: 0.9% hydrochloric acid containing 1% $AlCl_3 \times 9H_2O$ at 42° C., a current density of 98 $A/dm^2$ and a voltage of 30–50 V for a residence time of 10 seconds with subsequent:

Intermediate pickling: 10% sulphuric acid at 50° C. for a period of 15 seconds;

Nitric acid system: 1.2% nitric acid containing 2% $Al(NO_3)3 \times 6H_2O$ at 48° C., a current density of 98 $A/dm^2$ and a voltage of 30–50 V for a residence time of 10 seconds.

Anodizing: anodized in 18% sulphuric acid at a voltage of 20 V, the oxidation weight being about 4 $g/m^2$;

Post treatment: in 35% polyvinylphosphonic acid at 50° C. as disclosed in German Patent Specification No. 1,621,478. This treatment tends to also seal the anodic coating.

The application of a photosensitive coating was carried out using a positive-working radiation-sensitive mixture of the following composition in suitable solvent:

Film weight: 2 $g/m^2$ 1.8 parts of a naphthoquinone diazide sulphonic acid ester, as disclosed in European Published Specification No. 0,053,819;

0.2 parts of a napthoquinone diazide sulphonic acid chloride;

1.8 parts of a cresol-formaldehyde novolak having a melting range of 105°–120° C.;

0.1 part of crystal violet dissolved in ethylene glycol monomethyl ether.

In order to be able to assess the quality of the electrochemical roughening, the following parameters were utilized:

1. Peak-to-valley height

The peak-to-valley height affects the subsequent keying of the light-sensitive film with the aluminum and, subsequently, also the developability and print run.

A = peak-to-valley height after roughening in HCl bath

B = peak-to-valley height after roughening in $HNO_3$ bath

2. Brightness

The printing plates have to have as bright and uniform a grey tone as possible. A spotted, striped or nonuniformly colored surface is not commercially acceptable.

C = brightness

3. Oxide resistance

Printing plates which can be processed under all conditions are expected, on the one hand, to be capable of being processed very rapidly within a few seconds, but on the other hand, to be substantially resistant to excessive development, or to more chemically aggressive developers. In particular, the oxide can be readily destroyed by alkali based developers. Under these circumstances the oxide film takes on a chalky white bloom.

This effect is dependent on the concentration of alkali and the exposure time and manifests itself initially in the direct vicinity of demanding test elements and in half tone steps. With more intensive exposure, the oxide is extensively destroyed, as a result of which the service life of the printing plate is considerably shortened. In addition, such plates tend to tone after a press shut down, and this can only be eliminated by extensive cleaning treatments.

D = oxide resistance

4. Ink halo

This feature frequently encountered in printing plates is particularly visible after correction. It is due to dyestuff and film residues which are absorbed in the fine pores of the oxide and cannot be removed during the normal development process. Only the more aggressive correction agents make the incomplete development obvious. Faults may arise particularly at the junctions between corrected and uncorrected areas in the printing process in that these image-free points absorb ink. It is expected of a very good printing plate that the corrected regions are virtually indistinguishable from the uncorrected areas to the naked eye.

E = ink halo

5. Water balance

As little damping solution as possible should be required during printing. This prevents the ink becoming emulsified and the paper wet and corrugated. In addition, the contrast produced by the ink on the paper is greater, if less damping solution is used. Finally, the consumption of damping solution is a substantial cost factor.

F = water balance

To evaluate the above parameters, rating numbers from 1 to 6 were used which depict the behavior of the materials investigated, with high scores for good results and low scores for poor results. In the case of roughness, the peak-to-valley height was given a rating as the measured value, and in the case of the water balance the consumption of damping solution was given a rating by means of a score. The other parameters were assigned appropriate values in accordance with optical impression. The result is evident from Table 2. It is evident that, in the range according to the invention with a level of 0.1–0.3% by weight manganese, the criteria for the electrochemical roughening do not fall off substantially compared to the Al 99.5 material. Consequently, the advantage which the alloy according to the invention has in the case of thermal stability compared with Al 99.5 has not been achieved at the expense of substantial disadvantage in the other characteristics. The result is consequently optimum in the case of electrochemical roughening in HCl or $HNO_3$ baths, it being necessary to keep the alloy composition of the aluminum offset printing plate within narrow limits and with the formation of the phase structure being achieved by the special production process.

TABLE 1

| Material | Tensile strength Rm ($N/mm^2$) after anealing treatments | |
|---|---|---|
| Example 1 | | |
| Al 99.5 | 22° | 159–167 |
| (Standard) | 5 minutes 230° C. | 130–139 |
| | 8 minutes 240° C. | 120–130 |
| | 8 minutes 250° C. | 118–127 |
| | 1 hour 240° C. | 98–105 |
| Examples 2–5* | | |
| | 22° C. | 190–205 |
| | 5 minutes 230° C. | 188–193 |
| | 8 minutes 240° C. | 177–185 |
| | 8 minutes 250° C. | 165–179 |
| | 1 hour 240° C. | 150–160 |
| Example 6 | | |
| AlMn1Cu | 22° C. | 245–260 |
| (AA 3003) | 1 hour 240° C. | 200–205 |

*Example 2 is a sheet composed of 0.28 Fe, 0.13 Si and 0.12 Mn, remainder Al, all based on weight %.

TABLE 2

| Rating | Rating of the roughened-up (in HCl and $HNO_3$) and coated plates | | | | | |
|---|---|---|---|---|---|---|
| | Ex. 1 | Ex. 2 | Ex. 3 | Ex. 4 | Ex. 5 | Ex. 6 |
| 6 | | DE | DE | | | |
| 5 | CABDEF | CAB F | CAB F | DE | | |
| 4 | | | | CAB F | | |
| 3 | | | | | DEF | |
| 2 | | | | | CAB | DEF |
| 1 | | | | | | CAB |
| | Al 99.5 | AlMn | AlMn | AlMn 0.5 | AA3003 | |
| | | AlMn | 0.3 | | | |
| | | 0.1 | 0.2 | | | |

TABLE 2-continued

| Rating | Rating of the roughened-up (in HCl and $HNO_3$) and coated plates | | | | | |
|---|---|---|---|---|---|---|
| | Ex. 1 | Ex. 2 | Ex. 3 | Ex. 4 | Ex. 5 | Ex. 6 |
| AlMn | | | | | | |

What is claimed is:

1. A base material for aluminum offset printing sheets comprising an aluminum alloy consisting of from about 0.2 to about 0.6% by weight of iron, less than about 0.25% by weight silicon and copper combined, from about 0.1 to about 0.3% by weight manganese and the remainder being aluminum and trace production impurities, said base material further characterized as containing secondary precipitates in the form of phases of the Al Mn Si: Al Fe: Al Mn type which bear a ratio to one another of from about 1:1:2 to about 1:1:3, the mean particle size of said phases being from about 0.05 to about 0.10 micron with a maximum particle size of less than about 0.3 micron and further containing a precipitation structure with a degree of dispersion of less than about 50 phases per cubic micron.

2. The base material of claim 1 containing from about 0.04 to about 0.23% by weight of silicon.

3. The base material of claim 1 containing from about 0.27 to about 0.29% by weight of iron, from about 0.12 to about 0.14% by weight of silicon and from about 0.11 to about 0.13% by weight of manganese.

4. The base material of claim 1 in the form of a sheet, the surface of which has been roughened by a mechanical, chemical or electrochemical process, or a combination of such processes.

5. The sheet of claim 4 which has been roughened by an electrochemical process comprising immersion in an aqueous bath of HCl or $HNO_3$.

6. The sheet of claim 5 having an oxide film on the surface.

7. The sheet of claim 6 having a hydrophilic film over the oxide film.

8. The sheet of claim 7 having a light-sensitive coating over the hydrophilic film.

* * * * *

UNITED STATES PATENT AND TRADEMARK OFFICE
CERTIFICATE OF CORRECTION

PATENT NO. : 4,945,004

DATED : July 31, 1990

INVENTOR(S) : G. Sprintschnik et al.

It is certified that error appears in the above-identified patent and that said Letters Patent is hereby corrected as shown below:

Title Page, Category [75] - Inventors

The following are also coinventors of this patent:

Helmut Scheel, Grevenbroich and Helmut Schmiedel, Koln, both of the Federal Republic of Germany.

Signed and Sealed this

Thirty-first Day of December, 1991

*Attest:*

HARRY F. MANBECK, JR.

*Attesting Officer*

*Commissioner of Patents and Trademarks*